(No Model.)
O. S. WALKER.
BEARING FOR EMERY WHEELS.
No. 521,836. Patented June 26, 1894.
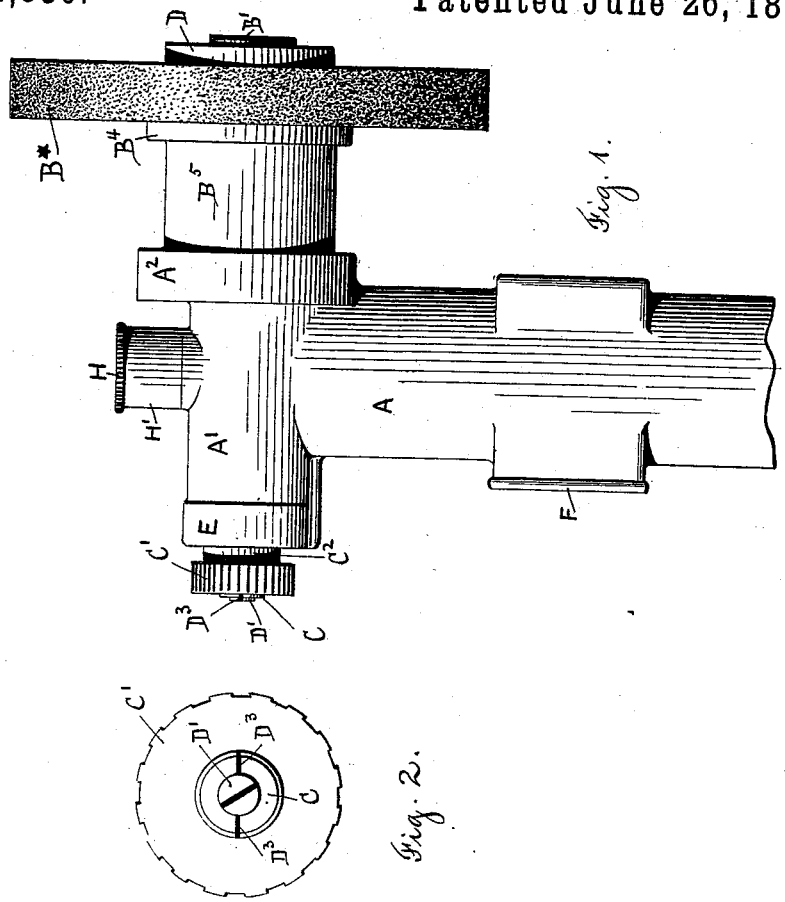
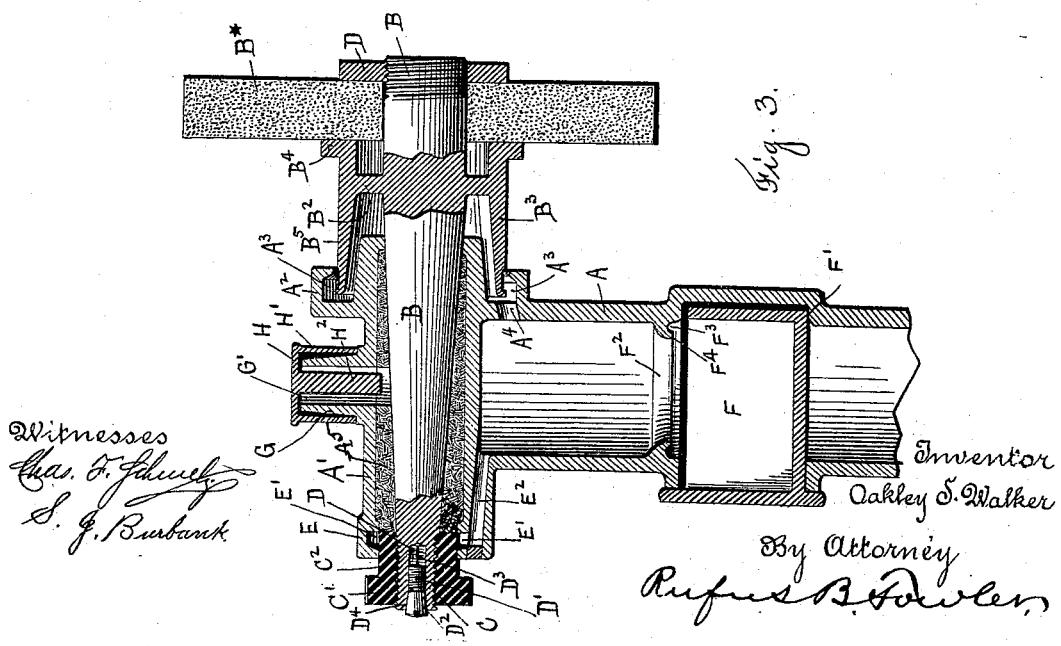
Witnesses
Chas. F. Schuelz
S. J. Burbank
Inventor
Oakley S. Walker
By Attorney
Rufus B. Fowler

UNITED STATES PATENT OFFICE.

OAKLEY S. WALKER, OF WORCESTER, MASSACHUSETTS, ASSIGNOR OF ONE-HALF TO THE NORTON EMERY WHEEL COMPANY, OF SAME PLACE.

BEARING FOR EMERY-WHEELS.

SPECIFICATION forming part of Letters Patent No. 521,836, dated June 26, 1894.

Application filed April 20, 1893. Serial No. 471,073. (No model.)

*To all whom it may concern:*

Be it known that I, OAKLEY S. WALKER, a citizen of the United States, residing at Worcester, in the county of Worcester and State of Massachusetts, have invented a new and useful Improvement in Bearings for Emery-Wheels, of which the following is a specification, reference being had to the accompanying drawings, forming a part of the same, and in which—

Figure 1 represents a side elevation of an emery wheel grinder embodying my invention. Fig. 2 is an end view upon a larger scale of the nut carried upon the end of the rotating spindle, and Fig. 3 is a central, vertical, sectional view.

Similar letters refer to similar parts in the different figures.

Referring to the accompanying drawings, A denotes a portion of the hollow supporting stand provided at its upper end with a horizontal bearing A' for a rotating spindle B carrying an emery wheel B*. The bearing A' consists of a cast shell, or case, preferably lined with Babbitt metal $A^5$, or other anti-friction material. The spindle B is made of cast metal with that portion inclosed in the bearing, slightly tapering to allow a longitudinal adjustment of the spindle, in order to take up the wear of the bearing. One end of the spindle projects beyond the bearing A' to receive the emery wheel B* and is provided at its end with a screw threaded section B' to receive the nut D. Between the screw threaded end of the spindle and the end of the bearing A', the spindle is provided with a radial web $B^2$; said web having at its periphery a cylindrical sleeve $B^3$ provided at one edge with a flange $B^4$, turned outwardly and forming a support against which the emery wheel B* is held by the nut D. The flange $B^4$, sleeve $B^3$, and web $B^2$, are all cast integrally with the spindle B. The edge of the sleeve $B^3$ opposite the flange $B^4$ extends over the end of the bearing A' and within the flange $A^2$, integral with the supporting stand A and forming an annular gutter $A^3$, into which the overflow of oil escaping from the end of the bearing A' will be conducted by the inner surface of the sleeve $B^3$. The annular gutter $A^3$ communicates with the interior of the hollow stand A, by means of a hole $A^4$, through which oil collected in the gutter $A^3$ will flow to the interior of the stand A. The outer surface $B^5$ of the sleeve $B^3$, serves as a belt pulley, by which the spindle is driven. The opposite, or smaller, end of the spindle B is provided with a screw thread C to receive a nut C', provided with a hub $C^2$ having its end resting against the end of the bearing A', so the rotation of the nut C' will serve to draw the tapering spindle B into the bearing, in order to take up the wear. The smaller end of the spindle B, is also provided with a screw threaded hole D to receive a screw D', provided with a plane and tapering section $D^2$, and the end of the spindle is split at $D^3$, so it will be expanded, as the tapering section $D^2$ of the screw, is drawn into the end of the spindle. The outer end of the screw threaded hole D is preferably made plane and slightly tapering at $D^4$ to correspond with the taper of the screw at $D^2$. Whenever the wear of the spindle bearing, renders an adjustment of the spindle necessary, the nut C' is screwed up against the end of the bearing and the end of the spindle expanded by means of the screw D' so as to produce sufficient friction between the screw threaded end of the spindle and the nut C' to prevent the nut from becoming loose. The end of the bearing A' is provided with a flange E, extending over a portion of the hub $C^2$ of the nut and provided with an annular gutter, or channel, E' in order to catch any oil that may work out from that end of the bearing. The channel, or gutter, E' communicates with the interior of the hollow stand A, by a passage $E^2$, which conducts the oil from the channel, or gutter, E' to the interior of the stand.

The hollow stand is provided on one side with an opening to allow an oil pan, or receiver, F to be inserted and having a ledge, or shoulder, F' upon which the inner end of the pan is supported. Above the oil pan F is an annular flange $F^2$, by which oil flowing down the interior surface of the hollow stand A, is carried toward the center of the stand and over the edges of the oil pan F. The annular flange $F^2$ is provided upon its underside with a groove, or channel, $F^3$ which serves to prevent the oil from passing the flange and causes it to drip into the pan from the edge F⁴ of the flange F². The bearing A', is provided with a hollow boss G inclosing a chamber G', communicating with the journal bearing of the spindle B to receive a supply of oil. The chamber G' is closed by a cap H, having a flange H' extending over the outside of the boss G and provided with a central spindle H² extending into the chamber G', so as to prevent the accidental displacement of the cap.

What I claim as my invention, and desire to secure by Letters Patent, is—

1. The combination with a supporting stand A and journal bearing of a spindle B provided with a web B² and sleeve B³, the latter serving as a pulley for said spindle, said sleeve and web, being formed integral with said spindle, substantially as described.

2. The combination with a spindle B, of a web B² and a sleeve B³, integral with said spindle, said sleeve having a flange B⁴ and said spindle having a screw threaded section B' and a nut carried by said screw threaded section by which an emery wheel is clamped against said flange, substantially as described.

3. The combination, with a hollow stand A and bearing A' and a spindle B, provided with a screw threaded end C, of a nut C' held on said screw threaded end and having a cylindrical hub C², said bearing A' provided with a flange E extending over a portion of said hub C² and having an annular channel E' surrounding said hub, provided with a passage E² leading from said channel to the interior of said hollow stand, substantially as described.

4. The combination with a tapering bearing A, of a tapering spindle B having its smaller end split and provided with a screw thread C, a nut carried by said spindle and arranged to bear against the end of the bearing, said spindle having a concentric screw threaded hole D in its end and a screw held therein, provided with a tapered section, whereby the split end of the spindle is expanded and the nut held from turning, substantially as described.

Dated this 11th day of March, 1893.

OAKLEY S. WALKER.

Witnesses:
RUFUS B. FOWLER,
EMMA KESTER.